United States Patent
Burnard et al.

(10) Patent No.: US 9,670,964 B1
(45) Date of Patent: Jun. 6, 2017

(54) DAMPER ON CONSTANT VELOCITY JOINT TUBE SEAT

(71) Applicant: Dana Automotive Systems Group, LLC, Maumee, OH (US)

(72) Inventors: Jon Burnard, Maumee, OH (US); Marc T. Feichter, Perrysburg, OH (US); DaWuan A. Smith, Sylvania, OH (US); Julie L. Stanley, Oregon, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/252,978

(22) Filed: Aug. 31, 2016

(51) Int. Cl.
| F16D 3/38 | (2006.01) |
| F16F 15/32 | (2006.01) |
| F16D 3/14 | (2006.01) |
| F16F 15/12 | (2006.01) |

(52) U.S. Cl.
CPC ............... *F16D 3/14* (2013.01); *F16D 3/387* (2013.01); *F16F 15/12* (2013.01); *F16F 15/322* (2013.01); *F16D 2300/22* (2013.01); *Y10S 464/906* (2013.01)

(58) Field of Classification Search
CPC . F16D 3/14; F16D 3/387; F16D 65/00; F16D 3200/22; F16D 2300/22; F16F 15/12; F16F 15/22; F16F 15/322; Y10S 464/904–464/906
USPC .......................................... 464/180, 904–906
See application file for complete search history.

(56) References Cited

U.S. PATENT DOCUMENTS

| 2,948,129 | A | | 8/1960 | Troyer | |
| 3,887,024 | A | | 6/1975 | Takahashi | |
| 3,940,948 | A | * | 3/1976 | Schultenkamper | ....... F16D 3/40 464/180 |
| 4,178,811 | A | | 12/1979 | Shepherd | |
| 5,050,446 | A | | 9/1991 | Takashima | |
| 5,145,025 | A | * | 9/1992 | Damian | .................. F16F 15/02 180/381 |
| 5,660,256 | A | | 8/1997 | Gallmeyer | |
| 6,773,354 | B2 | * | 8/2004 | Marriott | .................. F16D 3/387 464/180 |
| 6,889,803 | B2 | | 5/2005 | Schankin | |
| 7,178,423 | B2 | * | 2/2007 | Breese | ..................... F16D 3/387 188/266.1 |
| 7,946,925 | B2 | | 5/2011 | Kawakatsu | |

(Continued)

FOREIGN PATENT DOCUMENTS

| DE | 3906116 | C1 * | 6/1990 | ............... F16C 3/02 |
| DE | 102008017679 | A1 * | 10/2009 | ............. F16D 3/387 |
| EP | 0056306 | A2 * | 7/1982 | ................ F16C 3/02 |

*Primary Examiner* — Josh Skroupa
(74) *Attorney, Agent, or Firm* — Marshall & Melhorn, LLC

(57) ABSTRACT

A vehicle shaft assembly having a damper integrally connected to the constant velocity joint end of the shaft assembly. The shaft assembly includes a constant velocity joint stub shaft having a constant velocity joint stub shaft tube seat that is integrally connected to a shaft. Integrally connected to the outer surface of a constant velocity joint stub shaft tube seat is a damper. The damper may include a damper rubber first ring rotatively connected to a second damper ring acting as a rotational mass. Additionally, the damper may include an innermost steel ring and a damper rubber first ring rotatively connected to a second damper ring acting as a rotational mass.

17 Claims, 2 Drawing Sheets

(56) References Cited

U.S. PATENT DOCUMENTS

| | | | |
|---|---|---|---|
| 9,017,175 B2 | 4/2015 | Creek | |
| 2015/0018105 A1* | 1/2015 | Creek | F16D 1/076 464/127 |
| 2016/0281767 A1* | 9/2016 | Mori | F16F 15/322 |

* cited by examiner

DAMPER ON CONSTANT VELOCITY JOINT TUBE SEAT

FIELD OF THE DISCLOSURE

The present disclosure relates to a constant velocity joint tube seat having a damper.

BACKGROUND OF THE DISCLOSURE

During the operation of a motor vehicle various offensive and/or unwanted noise, vibration and/or harshness (NVH) may arise. These offensive and/or unwanted NVH can originate in the vehicle engine, transmission, transfer case, front axle assembly, rear axle assembly, a forward tandem axle assembly, a rear tandem axle assembly or in other vehicle components. In a non-limiting example, offensive and/or unwanted NVH may originate in the vehicle engine due to the firing order of the cylinders, in axle assemblies due to axle gear mashing or by the rotation of unbalanced shafts. As a result, dampers are typically used in the automotive industry to reduce and/or cancel the offensive or unwanted NVH that is found in the vehicle.

Automotive manufacturers often require the use of one or more dampers near the transmission, transfer case, front axles, rear axles, forward tandem axles, rear tandem axles and/or rear drive units. As a result, one or more dampers are attached to various vehicle shafts such as a propeller shaft, a drive shaft and/or a cardan shaft. By locating the damper on the vehicle shaft it decreases the critical speed of the shaft. The critical speed is the speed or revolutions per minute (RPM) of the shaft which coincides with the natural resonate frequency of the shaft. Once the critical speed is reached, the shaft becomes unstable and ruptures. This reduces the safe operating speed or RPM of the vehicle shaft. As a result, it would be advantageous to attach a damper to a vehicle shaft assembly in a location where it will not reduce the safe operating speed or RPM of the vehicle shaft in the vehicle shaft assembly.

Additionally, attaching the damper on the vehicle shaft puts the damper in a location that is further from a constant velocity joint (CVJ) which results in an increase in the dynamic instability of the shaft assembly. This increases the amount of and/or the magnitude of NVH in the vehicle shaft that the damper needs to reduce and/or cancel which results in a decrease in the life-span of the damper. It would therefore be advantageous to attach a damper to a vehicle shaft assembly in a location that is not going to unnecessarily add to the amount of and/or magnitude of NVH that the damper needs to reduce and/or cancel.

Furthermore, most vehicle shafts require balancing as a step to reduce the amount of NVH in a rotating shaft. By attaching the damper to the vehicle shaft it makes it more difficult to properly balance the shaft. This results in an increase in the amount of steps and time to manufacture the vehicle shaft which increases the overall cost of the component. As a result, it would be advantageous to attach a damper to a vehicle shaft assembly in a location that will reduce the overall time and cost needed manufacture the vehicle shaft assembly.

Lastly, given the variations in the dimensions of the vehicle shafts it makes it difficult to mass produce dampers that can be attached to the various shafts of a vehicle. It would therefore be advantageous to attach a damper in a location where the tolerances for the vehicle component are tighter resulting in less variation in part dimensions and making it easier to mass produce the damper.

SUMMARY OF THE DISCLOSURE

A shaft assembly for a vehicle having a damper on a constant velocity joint end of the shaft assembly. Drivingly connected to one end of a shaft is a constant velocity joint assembly having a constant velocity joint stub shaft. One end of the constant velocity joint stub shaft is drivingly connected to the constant velocity joint assembly. An end of the constant velocity joint stub shaft, opposite constant velocity joint assembly, includes an increased diameter portion which is integrally connected to an end of the shaft.

Integrally connected to the increased diameter portion of the constant velocity joint stub shaft is the damper. The damper may include a first damper ring and a second damper ring. An inner surface of the first damper ring is integrally connected to the increased diameter portion of the constant velocity joint stub shaft and an outer surface of the first damper ring is rotatively connected to an inner surface of the second damper ring.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Figure 1:
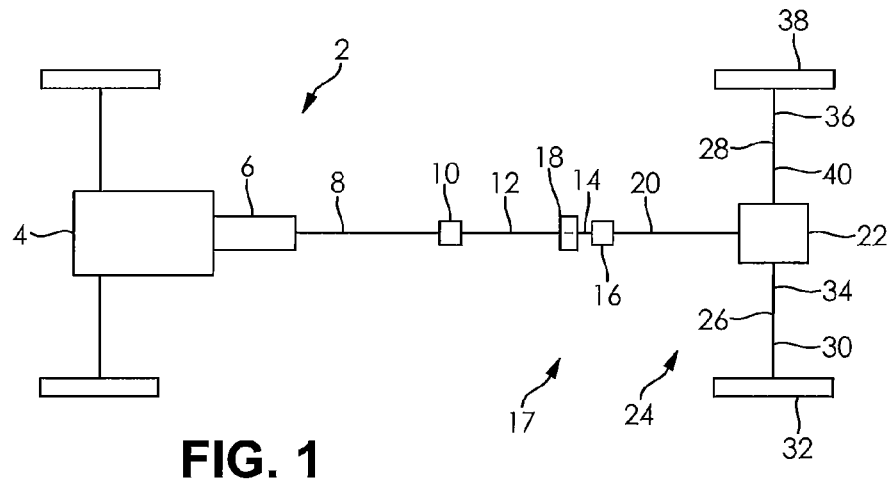
FIG. 1 is a schematic top-plan view of a vehicle having a shaft assembly according to an embodiment of the disclosure.

FIG. 1 is a schematic top-plan view of a vehicle 2 having a shaft assembly according to an embodiment of the disclosure. The vehicle 2 has an engine 4 which is drivingly connected to an end of a transmission 6. A transmission output shaft 8 is drivingly connected to an end of the transmission 6 opposite the engine 4. The transmission 6 is a power management system which provides controlled application of the rotational power generated by the engine 4 by means of a gear box.

An end of the transmission output shaft 8 opposite the transmission 6 is drivingly connected to an end of a universal joint assembly 10. The universal joint assembly 10 is a joint or coupling assembly that allows rotational energy to be transferred between shafts having a variable axis. In a non-limiting example, the universal joint assembly 10 may be a universal coupling, a U-joint, a cardan joint, a double cardan joint, a Spicer joint, a Hardy Spicer Joint or a Hooke's joint.

Drivingly connected to an end of the universal joint assembly 10 opposite the transmission output shaft 8 is a shaft 12. In a non-limiting example, the shaft 12 is a propeller shaft, a drive shaft, a cardan shaft, a double cardan shaft, a universal joint shaft, a universal coupling shaft, a Hooke's joint shaft or any other shaft in a vehicle drivetrain 17 that is used to transmit the rotational energy generated by the engine 4 to the drive wheel(s) of the vehicle 2. An end of the shaft 12 opposite the universal joint assembly 10 is drivingly connected to a constant velocity joint stub shaft 14 (herein after referred to as a "CVJ Stub shaft") of a constant velocity joint assembly 16 (hereinafter referred to as a "CVJ assembly"). The CVJ assembly 16 allows the rotational energy of the shaft 12 having a variable angle, to be transferred through the vehicle drivetrain 17 at a constant rotational speed without an appreciable increase in either friction or play.

Integrally connected to an outer surface of the CVJ stub shaft 14 is a damper 18. The damper 18 is a mechanical device that reduces, cancels and/or counteracts noise, vibration and/or harshness (NVH) from the vehicle drivetrain 17 that are offensive and/or unwanted. These offensive and/or unwanted NVH can originate in the vehicle engine, transmission, transfer case, front axle assembly, rear axle assembly or in other vehicle components. In a non-limiting example, offensive and/or unwanted NVH may originate in the vehicle engine due to the firing order of the cylinders, in axle assemblies due to axle gear mashing or by the rotation of unbalanced shafts.

Drivingly connected to an end of the CVJ assembly 16 opposite the shaft 12 is an end of a second shaft 20. Additionally, an end of the second shaft 20 opposite the CVJ assembly is drivingly connected to a differential 22 of an axle system 24. The differential 22 is a set of gears that allows the outer drive wheel(s) of a wheeled vehicle 2 to rotate at a faster rate than the inner drive wheel(s). As it can be by referencing FIG. 1, the second shaft 20 drivingly connects the transmission 6 to the differential 22 of the axle system 24. According to a non-limiting example, the second shaft 20 may be connected to the differential 22 through one or more of the following components (not shown), a drive shaft, a stub shaft, a coupling shaft, an axle system input shaft, a pinion gear shaft, a differential pinion gear shaft and/or a differential input shaft. The rotational power is transmitted through the axle system 24 as described in more detail below.

The axle system 24 further includes the use of a first axle half shaft 26 and a second axle half shaft 28. The first axle half shaft 26 extends substantially perpendicular to the second shaft 20. A first end 30 of the first axle half shaft 26 is drivingly connected to a first axle wheel assembly 32 and a second end 34 of the first axle half shaft 26 is drivingly connected to a side of the differential 22.

The second axle half shaft 28 also extends substantially perpendicular to the second shaft 20. A first end 36 of the second axle half shaft 28 is drivingly connected to a second axle wheel assembly 38 and a second end 40 of the second axle half shaft 28 is drivingly connected to a side of the differential 22 opposite the first axle half shaft 26.

Figure 2:
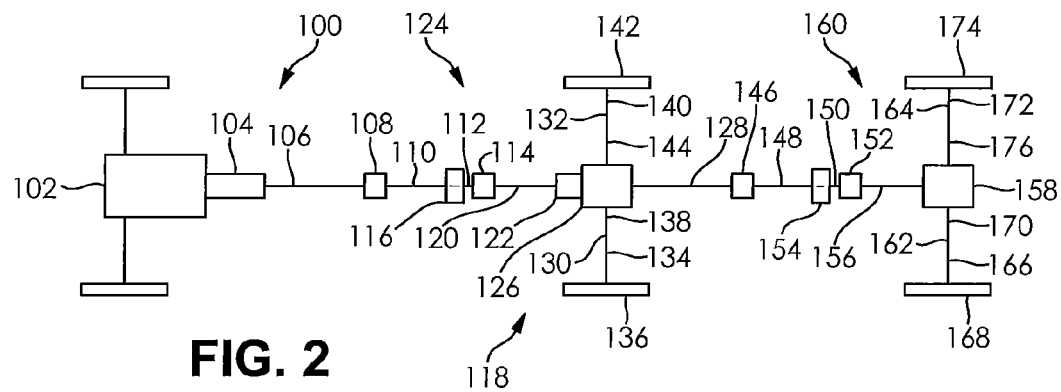
FIG. 2 is a schematic top-plan view of a vehicle having a shaft assembly according to another embodiment of the disclosure.

FIG. 2 is a schematic top-plan view of a vehicle 100 having a shaft assembly according to another embodiment of the disclosure. The vehicle 100 has an engine 102 which is drivingly connected to an end of a transmission 104. A transmission output shaft 106 is drivingly connected to an end of the transmission 104 opposite the engine 102. The transmission 104 is a power management system which provides controlled application of the rotational power generated by the engine 102 by means of a gear box.

An end of the transmission output shaft 106 opposite the transmission 104 is drivingly connected to an end of a universal joint assembly 108. The universal joint assembly 108 is a joint or coupling assembly that allows rotational energy to be transferred between shafts having a variable axis. In a non-limiting example, the universal joint assembly 108 may be a universal coupling, a U-joint, a cardan joint, a double cardan joint, a Spicer joint, a Hardy Spicer Joint or a Hooke's joint.

Drivingly connected to an end of the universal joint assembly 108 opposite the transmission output shaft 106 is a shaft 110. In a non-limiting example, the shaft 110 is a propeller shaft, a drive shaft, a cardan shaft, a double cardan shaft, a universal joint shaft, a universal coupling shaft, a Hooke's joint shaft or any other shaft in a vehicle drivetrain 118 that is used to transmit the rotational energy generated by the engine 102 to the drive wheel(s) of the vehicle 100. An end of the shaft 110 opposite the universal joint assembly 108 is drivingly connected to a CVJ Stub shaft 112 of a CVJ assembly 114. The CVJ assembly 114 allows the rotational energy of the shaft 110 having a variable angle, to be transferred through the vehicle drivetrain 118 at a constant rotational speed without an appreciable increase in either friction or play.

Integrally connected to an outer surface of the CVJ stub shaft 112 is a damper 116. The damper 116 is a mechanical device that reduces, cancels and/or counteracts NVH from the vehicle drivetrain 118 that are offensive and/or unwanted. These offensive and/or unwanted NVH can originate in the vehicle engine, transmission, transfer case, front axle assembly, forward tandem axle assembly, rear tandem axle assembly or in other vehicle components. In a non-limiting example, offensive and/or unwanted NVH may originate in the vehicle engine due to the firing order of the cylinders, in axle assemblies due to axle gear mashing or by the rotation of unbalanced shafts.

Drivingly connected to an end of the CVJ assembly 114 opposite the shaft 110 is an end of a second shaft 120. Additionally, an end of the second shaft 120 opposite the CVJ assembly 114 is drivingly connected to an inter-axle differential 122 of a forward tandem axle system 124. The inter-axle differential 122 is a device that divides the rotational power generated by the engine 102 between the axles in the vehicle 100. As it can be seen by referencing FIG. 2, the second shaft 120 drivingly connects the transmission 104 to the inter-axle differential 122 of the forward tandem axle system 124. According to a non-limiting example, the second shaft 120 may be connected to the inter-axle differential 122 through one or more of the following components (not shown), a drive shaft, a stub shaft, a coupling shaft, a forward tandem axle system input shaft, a pinion gear shaft, an inter-axle differential pinion gear shaft and/or an inter-axle differential input shaft. The rotational power is transmitted through the forward tandem axle system 124 as described in more detail below.

As illustrated in FIG. 2 the inter-axle differential 122 is drivingly connected to a forward tandem axle differential 126 and a forward tandem axle system output shaft 128. The forward tandem axle differential 126 is a set of gears that allows the outer drive wheel(s) of a wheeled vehicle 100 to rotate at a faster rate than the inner drive wheel(s).

The forward tandem axle system 124 further includes the use of a first forward tandem axle half shaft 130 and a second forward tandem axle half shaft 132. The first forward tandem axle half shaft 130 extends substantially perpendicular to the second shaft 120. A first end 134 of the first forward tandem axle half shaft 130 is drivingly connected to a first forward tandem axle wheel assembly 136 and a second end 138 of the first forward tandem axle half shaft 130 is drivingly connected to a side of the forward tandem axle differential 126.

Extending substantially perpendicularly with the second shaft 120 is the second forward tandem axle half shaft 132. A first end 140 of the second forward tandem axle half shaft 132 is drivingly connected to a second forward tandem axle wheel assembly 142 and a second end 144 of the second forward tandem axle half shaft 132 is drivingly connected to a side of the forward tandem axle differential 126 opposite the first forward tandem axle half shaft 130.

One end of the forward tandem axle system output shaft 128 is drivingly connected to a side of the inter-axle differential 122 opposite the second shaft 120. Drivingly connected to an end of the forward tandem axle system output shaft 128 opposite the inter-axle differential 122 is a second universal joint assembly 146. The second universal joint assembly 146 is a joint or coupling assembly that allows rotational energy to be transferred between shafts having a variable axis. In a non-limiting example, the second universal joint assembly 146 may be a universal coupling, a U-joint, a cardan joint, a double cardan joint, a Spicer joint, a Hardy Spicer Joint or a Hooke's joint.

Drivingly connected to an end of the second universal joint assembly 146 opposite the forward tandem axle system output shaft 128 is a third shaft 148. In a non-limiting example, the third shaft 148 is a propeller shaft, a drive shaft, a cardan shaft, a double cardan shaft, a universal joint shaft, a universal coupling shaft, a Hooke's joint shaft or any other shaft in the vehicle drivetrain 118 that is used to transmit the rotational energy generated by the engine 102 to the drive wheel(s) of the vehicle 100. An end of the third shaft 148 opposite the second universal joint assembly 146 is drivingly connected to a second CVJ stub shaft 150 of a second CVJ assembly 152. The second CVJ assembly 152 allows the rotational energy of the third shaft 148 having a variable angle, to be transferred through the vehicle drivetrain 118 at a constant rotational speed without an appreciable increase in either friction or play.

Integrally connected to an outer surface of the second CVJ stub shaft 150 is a second damper 154. The second damper 154 is a mechanical device that reduces, cancels and/or counteracts NVH from the vehicle drivetrain 118 that are offensive and/or unwanted. These offensive and/or unwanted NVH can originate in the vehicle engine, transmission, transfer case, front axle assembly, forward tandem axle assembly, rear tandem axle assembly or in other vehicle components. In a non-limiting example, offensive and/or unwanted NVH may originate in the vehicle engine due to the firing order of the cylinders, in axle assemblies due to axle gear mashing or by the rotation of unbalanced shafts.

Drivingly connected to an end of the CVJ assembly 152 opposite the third shaft 148 is an end of a fourth shaft 156. An end of the fourth shaft 156 opposite the CVJ assembly 152 is drivingly connected to a rear tandem axle differential 158 of a rear tandem axle system 160. The rear tandem axle differential 158 is a set of gears that allows the outer drive wheel(s) of a wheeled vehicle 100 to rotate at a faster rate than the inner drive wheel(s). As it can be by referencing FIG. 2, the fourth shaft 156 drivingly connects the inter-axle differential 122 to the rear tandem axle differential 158 of the rear tandem axle system 160. According to a non-limiting example, the fourth shaft 156 may be connected to the rear tandem axle differential 158 through one or more of the following components (not shown), a drive shaft, a stub shaft, a coupling shaft, a rear tandem axle system input shaft, a pinion gear shaft, a rear tandem axle differential pinion gear shaft and/or a rear tandem axle differential input shaft. The rotational power is transmitted through the rear tandem axle system 160 as described in more detail below.

The rear tandem axle system 160 further includes the use of a first rear tandem axle half shaft 162 and a second rear tandem axle half shaft 164. The first rear tandem axle half shaft 162 extends substantially perpendicular to the fourth shaft 156. A first end 166 of the first rear tandem axle half shaft 162 is drivingly connected to a first rear tandem axle wheel assembly 168 and a second end 170 of the first rear tandem axle half shaft 162 is drivingly connected to a side of the rear tandem axle differential 158.

Extending substantially perpendicularly with the fourth shaft 156 is the second rear tandem axle half shaft 164. A first end 172 of the second rear tandem axle half shaft 164 is drivingly connected to a second rear tandem axle wheel assembly 174 and a second end 176 of the second rear tandem axle half shaft 164 is drivingly connected to a side of the rear tandem axle differential 158 opposite the first rear tandem axle half shaft 162.

Figure 3:
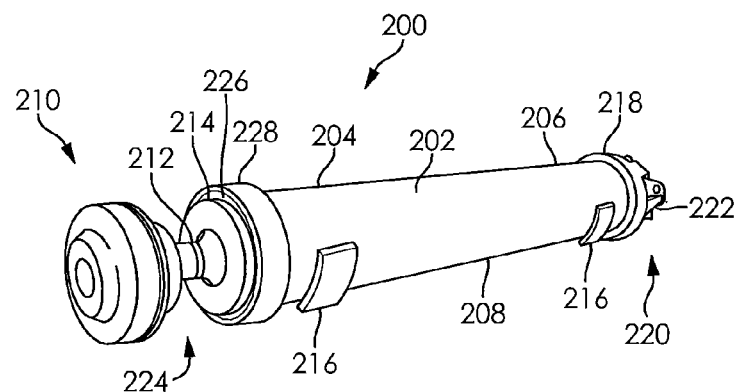
FIG. 3 is a perspective view of a shaft assembly having a damper according to an embodiment of the disclosure.

FIG. 3 is a perspective view of a shaft assembly 200 having a damper 224 according to an embodiment of the disclosure. The shaft assembly 200 includes a shaft 202 having a first end portion 204, a second end portion 206 and an outer surface 208. In a non-limiting example, the shaft 202 is a propeller shaft, a drive shaft, a cardan shaft, a double cardan shaft, a universal joint shaft, a universal coupling shaft, a Hooke's joint shaft or any other shaft in a vehicle drivetrain (not shown) that is used to transmit the rotational energy generated by the engine (not shown) to the drive wheel(s) (not shown) of the vehicle (not shown).

Drivingly connected to the first end portion 204 of the shaft 202 is a CVJ assembly 210 having a CVJ stub shaft 212. As previously discussed, the CVJ assembly 210 allows the rotational energy of the shaft 202 having a variable angle, to be transferred through the vehicle drivetrain (not shown) at a constant rotational speed without an appreciable increase in either friction or play. One end of the CVJ stub shaft 212 is drivingly connected to the CVJ assembly 210. An end of the CVJ stub shaft 212 opposite the CVJ assembly 210 has an increased diameter portion 214 that is integrally connected to the first end portion 204 of the shaft 202. The increased diameter portion 214 of the CVJ stub shaft 212 may be secured to the shaft 202 by welding, using one or more mechanical fasteners, by using one or more adhesives and/or by frictional engagement. In accordance with an embodiment of the disclosure, the increased diameter portion 214 on the CVJ stub shaft 212 is a CVJ stub shaft tube seat.

Disposed along the outer surface 208 of the shaft 202 is one or more balancing masses 216. Due to the various manufacturing and assembly processes associated with producing the shaft assembly 200 the shaft 202 may become un-balanced. As the un-balanced shaft 202 rotates it may cause offensive and/or unwanted NVH which may result in a catastrophic failure in one or more components in the shaft assembly 200. As a result, one or more balancing masses 216 may be attached to the outer surface 208 of the shaft 202 in predetermined locations to balance the shaft 202 thereby cancelling and/or reducing the magnitude and/or amount of NVH in the rotating shaft 202. The one or more balancing masses 216 may be secured to the outer surface 208 of the shaft 202 by welding, using one or more mechanical fasteners and/or by using one or more adhesives. In a non-limiting example, the balancing masses 216 have a curved shape that is complementary to the outer surface 208 of the shaft 202 providing the balancing mass 216 with maximum surface area contact with the outer surface 208 of the shaft 202.

Integrally connected to the second end portion 206 of the shaft 202 is a tube yoke 218 of a universal joint assembly 220. As previously discussed, in a non-limiting example, the universal joint assembly 220 may be a universal coupling, a U-joint, a cardan joint, a double cardan joint, a Spicer joint, a Hardy Spicer Joint or a Hooke's joint. The universal joint assembly 220 is a joint or coupling assembly that allows rotational energy to be transferred between shafts having a variable axis.

Drivingly connected to an end of the tube yoke 218 opposite the shaft 202 is a flange yoke 222. An end of the flange yoke 222 opposite the tube yoke 218 is a shaft (not shown). In a non-limiting example, the shaft (not shown) may be a transmission output shaft, a transfer case output shaft, an axle input shaft, an axle output shaft, a propeller shaft, a drive shaft, an inter-axle differential input shaft, an inter-axle differential output shaft, a cardan shaft, a double cardan shaft, a universal joint shaft, a universal coupling shaft, a Hooke's joint shaft or any other shaft in the drivetrain (not shown) that is used to transmit the rotational energy generated by the engine (not shown) to the drive wheel(s) (not shown) of the vehicle (not shown).

Integrally connected to the increased diameter portion 214 of the CVJ stub shaft 212 is the damper 224. In accordance with one embodiment of the disclosure, the damper 224 includes a first damper ring 226 and a second damper ring 228. The first damper ring 226 is integrally connected to the increased diameter portion 214 of the CVJ stub shaft 212. According to an embodiment of the disclosure, the first damper ring 226 is made of a damper rubber ring made of a plastic material, a rubber material, a synthetic rubber material, a natural rubber material and/or an elastomeric material.

Disposed radially outboard from the first damper ring 226 and rotatively connected to the first damper ring 226 is the second damper ring 228. Additionally, the second damper ring 228 is radially and longitudinally concentric with the first damper ring 226. In a non-limiting example, the second damper ring 228 is a steel forging, a machined steel, a cast steel, an iron forging, a machined iron and/or cast iron.

According to one embodiment of the disclosure, the second damper ring 228 radially compresses the first damper ring 226 between the increased diameter portion 214 of the CVJ stub shaft 212 and the second damper ring 228.

According to another embodiment of the disclosure, the first damper ring 226 is injected into the space between the increased diameter portion 214 of the CVJ stub shaft 212 and the second damper ring 228.

In operation, the first damper ring 226 acts like a spring and the second damper ring 228 acts like rotating inertial mass. When the offensive and/or unwanted NVH is present in the shaft assembly 202, the first damper ring 226 expands and contracts allowing the second damper ring 228 to rotate and/or vibrate in the opposite direction or in the opposite phase of the unwanted and/or offensive NVH. As a result, the magnitude of the unwanted and/or offensive NVH is reduced, cancelled and/or counter-acted.

The damper 224 according to the disclosure, is able to be tuned depending on the type, amount and/or magnitude of the offensive and/or unwanted NVH that is being reduced and/or cancelled. The damper 224 is tuned by making alterations to the first damper ring 226 and/or the second damper ring 228. By altering the material used for the first damper ring 226 the spring rate of the first damper ring 266 can be changed depending on the type, amount and/or magnitude of the offensive and/or unwanted NVH that is being reduced and/or cancelled. Similarly, depending on the type, amount and/or magnitude of the offensive and/or unwanted NVH that is being reduced and/or cancelled, the mass of the second damper ring 228 and/or the inertia of the second damper ring 228 can be changed. In a non-limiting example, a damper inertia of 2000-8000 kg-mm^2 will reduce and/or cancel an NVH frequency of 300-600 Hz.

Figure 4:
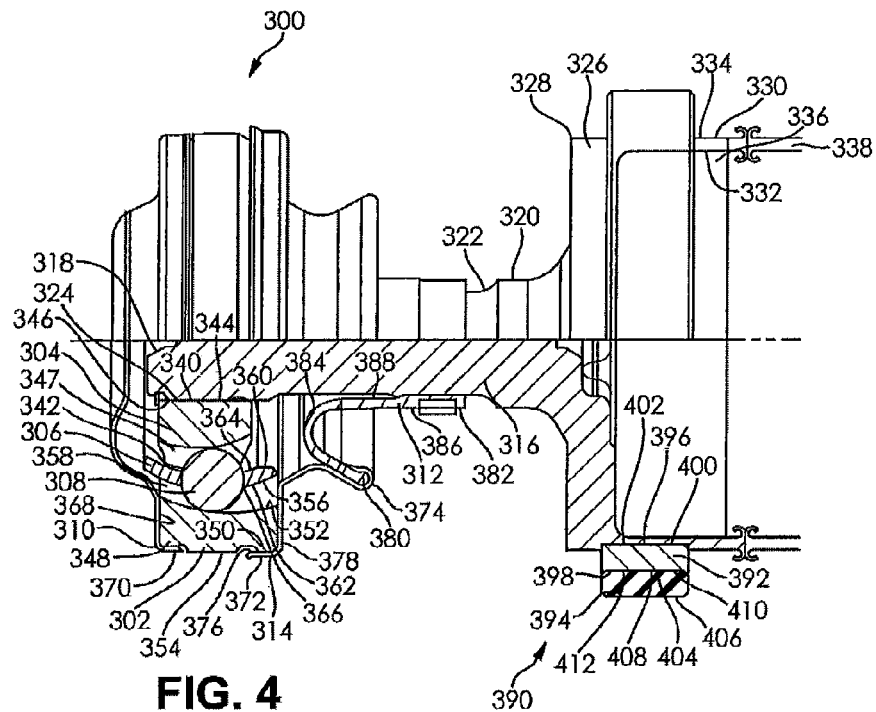
FIG. 4 is a schematic partial cut-away view a constant velocity joint assembly end of a shaft assembly having a damper according to an embodiment of the disclosure.

FIG. 4 is a schematic partial cut-away view of a CVJ assembly 300 end of a shaft assembly having a damper 390 according to an embodiment of the disclosure. The CVJ assembly 300 includes an outer race 302, an inner race 304, a cage 306, a plurality of balls 308, a dust cap 310, a flexible boot 312, a boot can 314 and a CVJ stub shaft 316. The CVJ stub shaft 316 has a first end portion 318, a second end portion 320 and an outer surface 322. Circumferentially extending from the outer surface 322 of the first end portion 318 of the CVJ stub shaft 316 is a plurality of splines 324. Extending co-axially with the CVJ stub shaft 316, on the second end portion 320 of the CVJ stub shaft 316, is an increased diameter portion 326 having a first end portion 328 a second end portion 330, an inner surface 332 and an outer surface 334. The inner surface 332 and the outer surface 334 of the increased diameter portion 326 defines a hollow portion 336 therein.

Integrally connected to the second end portion 330 of the increased diameter portion 326 of the CVJ stub shaft 316 is an end of a shaft 338. The second end portion 330 of the increased diameter portion 326 of the CVJ stub shaft 316 may be secured to the end of the shaft 338 by welding, by using one or more adhesives and/or by frictional engagement. In a non-limiting example, the shaft 338 is a propeller shaft, a drive shaft, a cardan shaft, a double cardan shaft, a universal joint shaft, a universal coupling shaft, a Hooke's joint shaft or any other shaft in a vehicle drivetrain (not shown) that is used to transmit the rotational energy generated by the engine (not shown) to the drive wheel(s) (not shown) of the vehicle (not shown).

Disposed radially outboard from the first end portion 318 of the CVJ stub shaft 316 and extending co-axially with the CVJ stub shaft 316 is the inner race 304. The inner race 304 has an inner surface 340 and an outer surface 342 defining a hollow portion 344 therein. Circumferentially extending from the inner surface 340 of the inner race 304 is a plurality of splines 346 that are complementary to and meshingly engaged with the plurality of splines 324 on the first end portion 318 of the CVJ stub shaft 316. The plurality of splines 346 on the inner surface 340 of the inner race 304 drivingly connects the CVJ stub shaft 316 to the CVJ assembly 300 allowing the rotational energy from the shaft 338 to be transferred to the CVJ assembly 300. Additionally, circumferentially extending radially inboard from the outer surface 342 of the inner race 304 is a plurality of grooves 347.

Located radially outboard from the inner race 304 is the outer race 302 having a first end portion 348 a second end portion 350, an inner surface 352 and an outer surface 354. The inner surface 352 and the outer surface 354 of the outer race 302 defines a hollow portion 356 therein. Circumferentially extending radially inboard from the inner surface 352 of the outer race 302 is a plurality of grooves 358 that are complementary to the plurality of grooves 347 on the outer surface 342 of the inner race 304.

Interposed between the outer surface 342 of the inner race 304 and the inner surface 352 of the outer race 302 is the cage 306 having an inner surface 360 and an outer surface 362 defining a hollow portion 364 therein. Extending from the inner surface 360 to the outer surface 362 of the cage 306 is a plurality of apertures 366.

Drivingly connecting the inner race 304 to the outer race 302 and disposed within the plurality of grooves 358 on the inner surface 352 of the outer race 302 and within the plurality of grooves 347 on the outer surface 342 of the inner race 302 is the plurality of bearings 308. Additionally, the plurality of balls 308 are disposed within the plurality of apertures 366 in the cage 306. When in operation, the plurality of balls 308 rotate and move along the plurality of grooves 347 and 358. In a non-limiting example, the plurality of balls 308 are a plurality of ball bearings.

As illustrated in FIG. 4, the dust cap 310 has an inner surface 368 and an outer surface 370. The inner surface 368 of the dust cap 310 is integrally connected to the outer surface 356 of the first end portion 348 of the outer race 302. In a non-limiting example, the inner surface 368 of the dust cap 310 may be secured to the outer surface 354 of the first end portion 348 of the outer race 302 by welding, using one or more mechanical fasteners, by using one or more adhesives and/or by frictional engagement. The dust cap 310 provides a seal for the CVJ assembly 300 preventing the migration of dust, debris and moisture from the external environment into the CVJ assembly 300.

The boot can 314 of the CVJ assembly illustrated in FIG. 4 has a first end portion 372, a second end portion 374, an inner surface 376 and an outer surface 378. The Inner surface 376 of the boot can 314 is integrally connected to the outer surface 354 of the second end portion 350 of the outer race 302. In a non-limiting example, the inner surface 376 of the boot can 314 may be secured to the outer surface 354 of the second end portion 350 of the outer race 302 by welding, using one or more mechanical fasteners, by using one or more adhesives and/or by frictional engagement.

Disposed radially outboard from the CVJ stub shaft 316 is a flexible boot 312 having a first end portion 380, a second end portion 382, an inner surface 384 and an outer surface 386. The inner surface 384 and the outer surface 384 of the flexible boot 312 defines a hollow portion 388 therein. The first end portion 380 of the flexible boot 312 is integrally connected the second end portion 374 of the boot can 314. In a non-limiting example, the first end 380 of the flexible boot 312 is secured to the second end portion 374 of the boot can 314 by welding, using one or more mechanical fasteners, by one or more adhesives and/or by mechanically crimping the second end portion 374 of the boot can 314 to the first end portion 380 of the flexible boot 312.

The second end portion 382 of the flexible boot 312 is integrally connected to the outer surface 322 of the CVJ stub shaft 316 at a location axially inboard from the plurality of splines 324 and the increased diameter portion 326. According to an embodiment of the disclosure, the second end portion 382 of the flexible boot 312 may be secured to the outer surface 322 of the CVJ stub shaft 316 by welding, using one or more mechanical fasteners, by using one or more adhesives and/or by frictional engagement. The flexible boot 312 provides a flexible seal for the CVJ assembly 300 preventing the migration of dust, debris and moisture from the external environment into the CVJ assembly 300.

Integrally connected to the outer surface 334 of the increased diameter portion 326 of the CVJ stub shaft 316 is the damper 390. The damper 390 includes a first damper ring 392 and a second damper ring 394. The first damper ring 392 has an inner surface 396 and an outer surface 398 defining a hollow portion 400 therein. The inner surface 396 of the first damper ring 392 is integrally connected to the outer surface 334 of the increased diameter portion 326 on the second end portion 320 of the CVJ stub shaft 316. In a non-limiting example, the inner surface 396 of the first damper ring 392 is secured to the outer surface 334 of the increased diameter portion 326 of the CVJ stub shaft 316 by welding, by using one or more mechanical fasteners, by using one or more adhesives and/or by frictional engagement. According to an embodiment of the disclosure, the first damper ring 392 is made of a damper rubber ring made of a plastic material, a rubber material, a synthetic rubber material, a natural rubber material and/or an elastomeric material.

In accordance with an alternative embodiment of the disclosure, the outer surface 334 of the increased diameter portion 326 of the CVJ stub shaft 316 includes one or more channels 402 that circumferentially extend along at least a portion of the outer surface 334 of the increased diameter portion 326. According to this embodiment of the disclosure, at least a portion of the inner surface 396 of the first damper ring 392 is disposed within the one or more channels 402 on the outer surface 334 of the increased diameter portion 326 of the CVJ stub shaft 316.

The one or more channels 402 on the outer surface 334 of the increased diameter portion 326 of the CVJ stub shaft 316, provide an increase in surface area contact between the first damper ring 392 and the increased diameter portion 326 of the CVJ stub shaft 316. As a result, the one or more channels 402 on the outer surface 334 of the increased diameter portion 326 of the CVJ stub shaft 316 aid in securing the first damper ring 392 to the increased diameter portion 326 of the CVJ stub shaft 316. In accordance with this embodiment of the disclosure, the first damper ring 392 may be secured to the outer surface 334 of the increased diameter portion 326 of the CVJ stub shaft 316 by welding, by using one or more mechanical fasteners, by using one or more adhesives and/or by frictional engagement.

Disposed radially outboard from and the first damper ring 392 is the second damper ring 394. Additionally, the second damper ring 394 is radially and longitudinally concentric with the first damper ring 392. The second damper ring 394 has an inner surface 404 and an outer surface 406 defining a hollow portion 408 therein. The inner surface 404 of the second damper ring 394 is integrally connected to the outer surface 398 of the first damper ring 392. According to an embodiment of the disclosure, the inner surface 404 of the second damper ring 394 may be secured to the outer surface 398 to the first damper ring 392 by welding, by using one or more mechanical fasteners, by using one or more adhesives and/or by frictional engagement. In a non-limiting example, the second damper ring 394 is a steel forging, a machined steel, a cast steel, an iron forging, a machined iron and/or cast iron.

In accordance with an alternative embodiment of the disclosure, the second damper ring 394 radially compresses the first damper ring 392 between the increased diameter portion 326 of the CVJ stub shaft 316 and the second damper ring 394.

According to yet another embodiment of the disclosure, the first damper ring 392 is injected into the space between the increased diameter portion 326 and the second damper ring 394.

According to still another embodiment, the outer surface 398 of the first damper ring 392 has one or more channels 410 that circumferentially extend along at least a portion of the outer surface 398 of the first damper ring 392. In accordance with this embodiment, at least a portion of the inner surface 404 of the second damper ring 394 is disposed within the one or more channels 410 on the outer surface 398 of the first damper ring 392. The one or more channels 410 on the outer surface 398 of the first damper ring 392 provide an increase in surface area contact between the first damper ring 392 and the second damper ring 394. As a result, the one or more channels 410 on the outer surface 398 of the first damper ring 392 aid in securing the first damper ring 392 to the second damper ring 394. As previously discussed, the second damper ring 394 may be secured to the first damper ring 392 by welding, by using one or more mechanical fasteners, by using one or more adhesives and/or by frictional engagement.

In still a further embodiment of the disclosure, the inner surface 404 of the second damper ring 394 includes one or more protruding portions 412 that circumferentially extend radially inboard from the inner surface 404 of the second damper ring 394. According to this embodiment, at least a portion of the one or more protruding portions 412 on the inner surface 404 of the second damper ring 394 are disposed within the one or more channels 410 on the outer surface 398 of the first damper ring 392. The one or more channels 410 on the outer surface 398 of the first damper ring 392, along with the one or more protruding portions 412 on the inner surface 404 of the second damper ring 394, provide an increase in surface area contact between the first damper ring 392 and the second damper ring 394. As a result, the one or more channels 410 on the outer surface 398 of the first damper ring 392, in combination with the one or more protruding portions 412 on the inner surface 404 of the second damper ring 394, aid in securing the first damper ring 392 to the second damper ring 394. As previously discussed, the second damper ring 394 may be secured to the first damper ring 392 by welding, by using one or more mechanical fasteners, by using one or more adhesives and/or by frictional engagement.

In yet a further embodiment of the disclosure (not shown), the outer surface of the first damper ring has one or more increased diameter portions (not shown) circumferentially extending from at least a portion of the outer surface of the first damper ring, as opposed to the one or more channels 410 illustrated in FIG. 4. Additionally, in accordance with this embodiment of the disclosure (not shown), the inner surface of the second damper ring has one or more channels (not shown) that circumferentially extend along at least a portion of the inner surface of the second damper ring, as opposed to the one or more protruding portions 412 illustrated in FIG. 4. According to this embodiment (not shown), at least a portion of the one or more increased diameter portions (not shown) on the outer surface of the first damper ring are disposed within the one or more channels (not shown) on the inner surface of the second damper ring.

The one or more channels (not shown) on the inner surface of the second damper ring, along with the one or more protruding portions (not shown) on the outer surface of the first damper ring, provide an increase in surface area contact between the first damper ring and the second damper ring. As a result, the one or more channels (not shown) on the inner surface of the second damper ring, in combination with the one or more protruding portions (not shown) on the outer surface of the first damper ring, aid in securing the first damper ring to the second damper ring. As previously discussed, the first damper ring may be secured to the second damper ring by welding, by using one or more mechanical fasteners, by using one or more adhesives and/or by frictional engagement.

In operation, the first damper ring 392 acts like a spring and the second damper ring 394 acts like rotating inertial mass. When the offensive and/or unwanted NVH is present in the shaft assembly (not shown), the first damper ring 392 expands and contracts allowing the second damper ring 394 to rotate and/or vibrate in the opposite direction or in the opposite phase of the unwanted and/or offensive NVH. As a result, the magnitude of the unwanted and/or offensive NVH is reduced, cancelled and/or counter-acted.

The damper 390 according to the disclosure, is able to be tuned depending on the type, amount and/or magnitude of the offensive and/or unwanted NVH that is being reduced and/or cancelled. The damper 390 is tuned by making alterations to the first damper ring 392 and/or the second damper ring 394. By altering the material used for the first damper ring 392, the spring rate of the first damper ring 392 can be changed, depending on the type, amount and/or magnitude of the offensive and/or unwanted NVH that is being reduced and/or cancelled. Similarly, depending on the type, amount and/or magnitude of the offensive and/or unwanted NVH that is being reduced and/or cancelled, the mass of the second damper ring 394 and/or the inertia of the second damper ring 394 can be changed. In a non-limiting example, a damper inertia of 2000-8000 kg-mm^2 will reduce and/or cancel an NVH frequency of 300-600 Hz.

Figure 5:
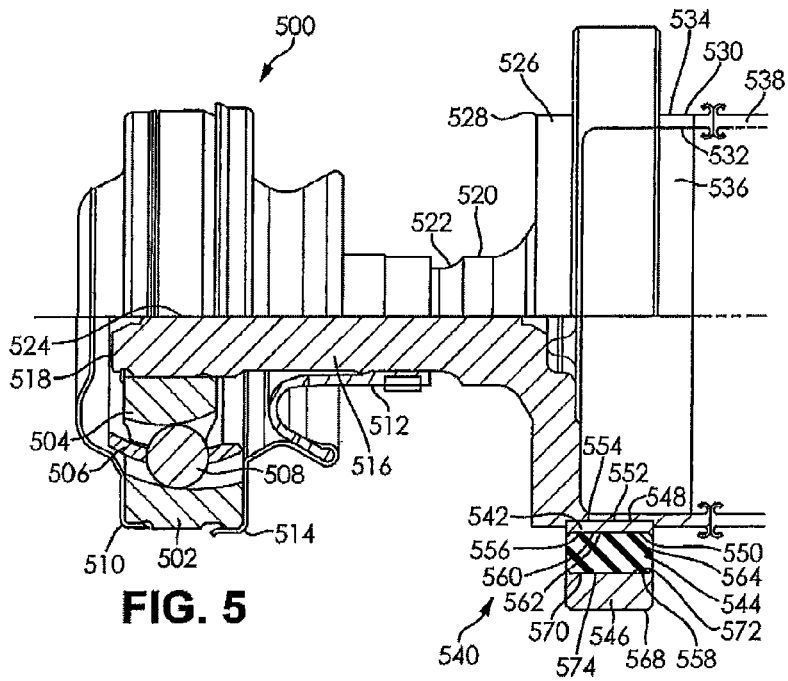
FIG. 5 is a schematic partial cut-away view of a constant velocity joint assembly end of a shaft assembly having a damper according to another embodiment of the disclosure.

FIG. 5 is a schematic partial cut-away view of a CVJ assembly 500 end of a shaft assembly having a damper 540 according to another embodiment of the disclosure. Similar to the embodiment of the disclosure illustrated in FIG. 4, the CVJ assembly 500 includes an outer race 502, an inner race 504, a cage 506, a plurality of balls 508, a dust cap 510, a flexible boot 512, a boot can 514 and a CVJ stub shaft 516.

The CVJ stub shaft 516 has a first end portion 518, a second end portion 520 and an outer surface 522. Circumferentially extending from the outer surface 522 of the first end portion 518 of the CVJ stub shaft 516 is a plurality of splines 524 that drivingly connects the CVJ stub shaft 516 to the inner race 504 of the CVJ assembly 500.

Extending co-axially with the CVJ stub shaft 516, on the second end portion 520 of the CVJ stub shaft 516, is an increased diameter portion 526 having a first end portion 528, a second end portion 530, an inner surface 532 and an outer surface 534. The inner surface 532 and the outer surface 534 of the increased diameter portion 526 defines a hollow portion 536 therein.

Integrally connected to the second end portion 530 of the increased diameter portion 526 of the CVJ stub shaft 516 is an end of a shaft 528. The second end portion 530 of the increased diameter portion 526 of the CVJ stub shaft 516 may be secured to the end of the shaft 538 by welding, by using one or more adhesives and/or by frictional engagement. In a non-limiting example, the shaft 538 is a propeller shaft, a drive shaft, a cardan shaft, a double cardan shaft, a universal joint shaft, a universal coupling shaft, a Hooke's joint shaft or any other shaft in a vehicle drivetrain (not shown) that is used to transmit the rotational energy generated by the engine (not shown) to the drive wheel(s) (not shown) of the vehicle (not shown).

Integrally connected to the outer surface 534 of the increased diameter portion 526 of the CVJ stub shaft 516 is the damper 540. The damper 540 includes an inner most damper ring 542, a first damper ring 544 and a second damper ring 546. The innermost damper ring 542 has an inner surface 548 and an outer surface 550 defining a hollow portion 552 therein. The inner surface 548 of the innermost damper ring 542 is integrally connected to the outer surface 534 of the increased diameter portion 526 on the second end portion 520 of the CVJ stub shaft 516. In a non-limiting example, the inner surface 548 of the innermost damper ring 542 is secured to the outer surface 534 of the increased diameter portion 526 of the CVJ stub shaft 516 by welding, by using one or more mechanical fasteners, by using one or more adhesives and/or by frictional engagement. According to an embodiment of the disclosure, the innermost damper ring 542 is made of a steel alloy, an aluminum alloy, an iron alloy or any other material that will aid in securing the first damper ring 544 to the outer surface 534 of the increased diameter portion 526 of the CVJ stub shaft 516.

In accordance with an alternative embodiment of the disclosure, the outer surface 534 of the increased diameter portion 526 of the CVJ stub shaft 516 includes one or more channels 554 that circumferentially extend along at least a portion of the outer surface 534 of the increased diameter portion 526. According to this embodiment of the disclosure, at least a portion of the inner surface 548 of the innermost damper ring 542 is disposed within the one or more channels 554 on the outer surface 534 of the increased diameter portion 526 of the CVJ stub shaft 516. The one or more channels 554 on the outer surface 534 of the increased diameter portion 526 of the CVJ stub shaft 516, provide an increase in surface area contact between the innermost damper ring 542 and the increased diameter portion 526 of the CVJ stub shaft 516. As a result, the one or more channels 554 on the outer surface 534 of the increased diameter portion 526 of the CVJ stub shaft 516 aid in securing the innermost damper ring 542 to the increased diameter portion 526 of the CVJ stub shaft 516. In accordance with this embodiment of the disclosure, the innermost damper ring 542 may be secured to the outer surface 534 of the increased diameter portion 526 of the CVJ stub shaft 516 by welding, by using one or more mechanical fasteners, by using one or more adhesives and/or by frictional engagement.

Disposed radially outboard from the innermost damper ring 542 is the first damper ring 544. Additionally, the first damper ring 544 is radially and longitudinally concentric with the innermost damper ring 542. The first damper ring 544 has an inner surface 556 and an outer surface 558 defining a hollow portion 560 therein. The inner surface 556 of the first damper ring 544 is integrally connected to the outer surface 550 of the innermost damper ring 542. In a non-limiting example, the inner surface 556 of the first damper ring 544 is secured to the outer surface 550 of the innermost damper ring 542 by welding, by using one or more mechanical fasteners, by using one or more adhesives and/or by frictional engagement. According to an embodiment of the disclosure, the first damper ring 544 is made of a damper rubber ring made of a plastic material, a rubber material, a synthetic rubber material, a natural rubber material and/or an elastomeric material.

In an alternative embodiment of the disclosure, the innermost damper ring 542 has one or more channels 562 that circumferentially extend along at least a portion of the outer surface 550 of the innermost damper ring 542. According to this embodiment of the disclosure, at least a portion of the inner surface 560 of the first damper ring 544 is disposed within the one or more channels 562 on the outer surface 550 of the innermost damper ring 542. The one or more channels 562 on the outer surface 550 of the innermost damper ring 542 provide an increase in surface area contact between the innermost damper ring 542 and the first damper ring 544. As a result, the one or more channels 562 on the outer surface 550 of the innermost damper ring 542 aid in securing the first damper ring 544 to the innermost damper ring 542. As previously discussed, the first damper ring 544 may be secured to the innermost damper ring 542 by welding, by using one or more mechanical fasteners, by using one or more adhesives and/or by frictional engagement.

According to another embodiment of the disclosure, the inner surface 560 of the first damper ring 544 has one or more protruding portions 564 that circumferentially extend radially inboard from the inner surface 556 of the first damper ring 544. According to this embodiment, at least a portion of the one or more protruding portions 564 extend into the one or more channels 562 on the outer surface 550 of the innermost damper ring 542. The one or more channels 562 on the outer surface 550 of the innermost damper ring 542, along with the one or more protruding portions 564 on the inner surface 556 of the first damper ring 544, provide an increase in surface area contact between the innermost damper ring 542 and the first damper ring 544. As a result, the one or more channels 562 on the outer surface 550 of the innermost damper ring 542, in combination with the one or more protruding portions 564 on the inner surface 556 of the first damper ring 544, aid in securing the first damper ring 544 to the innermost damper ring 542. As previously discussed, the first damper ring 544 may be secured to the innermost damper ring 542 by welding, by using one or more mechanical fasteners, by using one or more adhesives and/or by frictional engagement.

In still another embodiment of the disclosure (not shown), the outer surface of the innermost damper ring has one or more increased diameter portions (not shown) circumferentially extending from at least a portion of the outer surface of the first damper ring, as opposed to the one or more channels 562 illustrated in FIG. 5. Additionally, in accordance with this embodiment of the disclosure (not shown), the inner surface of the first damper ring has one or more channels (not shown) circumferentially extending along the inner surface of the first damper ring as opposed to the one or more protruding portions 564 illustrated in FIG. 5. According to this embodiment (not shown), at least a portion of the one or more increased diameter portions (not shown) on the outer surface of the innermost damper ring are disposed within the one or more channels (not shown) on the inner surface of the first damper ring.

The one or more channels (not shown) on the inner surface of the first damper ring, along with the one or more protruding portions (not shown) on the outer surface of the innermost damper ring, provide an increase in surface area contact between the innermost damper ring and the first damper ring. As a result, the one or more channels (not shown) on the inner surface of the first damper ring, in combination with the one or more protruding portions (not shown) on the outer surface of the innermost damper ring, aid in securing the first damper ring to the innermost damper ring. As previously discussed, the first damper ring may be secured to the innermost damper ring by welding, by using one or more mechanical fasteners, by using one or more adhesives and/or by frictional engagement.

Disposed radially outboard from the first damper ring 544 is the second damper ring 546. Additionally, the second damper ring 546 is radially and longitudinally concentric with the first damper ring 544. The second damper ring 546 has an inner surface 566 and an outer surface 568 defining a hollow portion 570 therein. The inner surface 566 of the second damper ring 546 is integrally connected to the outer surface 558 of the first damper ring 544. According to an embodiment of the disclosure, the inner surface 566 of the second damper ring 546 may be secured to the outer surface 558 to the first damper ring 544 by welding, by using one or more mechanical fasteners, by using one or more adhesives and/or by frictional engagement. In a non-limiting example, the second damper ring 546 is a steel forging, a machined steel, a cast steel, an iron forging, a machined iron and/or cast iron.

In accordance with an alternative embodiment of the disclosure, the second damper ring 546 radially compresses the first damper ring 544 between the innermost damper ring 542 and the second damper ring 546.

According to yet another embodiment of the disclosure, the first damper ring 544 is injected into the space between the innermost damper ring 542 and the second damper ring 546.

According to still another alternative embodiment of the disclosure, the outer surface 558 of the first damper ring 544 has one or more increased diameter portions 572 circumferentially extending from at least a portion of the outer surface 558 of the first damper ring 544. In accordance with this embodiment of the disclosure, the inner surface 566 of the second damper ring 546 has one or more channels 574 that circumferentially extend along at least a portion of the inner surface 566 of the second damper ring 546. According to this embodiment, at least a portion of the one or more increased diameter portions 572 on the outer surface 558 of the first damper ring 544 are disposed within the one or more channels 574 on the inner surface 566 of the second damper ring 546.

The one or more channels 574 on the inner surface 566 of the second damper ring 546, along with the one or more increased diameter portions 572 on the outer surface 556 of the first damper ring 544, provide an increase in surface area contact between the second damper ring 546 and the first damper ring 544. As a result, the one or more channels 574 on the inner surface 566 of the second damper ring 546, in combination with the one or more increased diameter portions 572 on the outer surface 556 of the first damper ring 544, aid in securing the second damper ring 546 to the first damper ring 544. As previously discussed, the first damper ring 544 may be secured to the second damper ring 546 by welding, by using one or more mechanical fasteners, by using one or more adhesives and/or by frictional engagement.

In accordance with still a further embodiment of the disclosure (not shown), the outer surface of the first damper ring has one or more channels (not shown) circumferentially extending from at least a portion of the outer surface of the first damper ring, as opposed to the one or more increased diameter portions 572 illustrated in FIG. 5. Additionally, in accordance with this embodiment of the disclosure (not shown), the inner surface of the second damper ring has one or more protruding portions (not shown) that circumferentially extend from at least a portion of the inner surface of the second damper ring, as opposed to the one or more channels 574 illustrated in FIG. 5. According to this embodiment of the disclosure (not shown), at least a portion of the one or more increased diameter portions (not shown) on the inner surface of the second damper ring are disposed within the one or more channels (not shown) on the outer surface of the first damper ring.

The one or more channels (not shown) on the outer surface of the first damper ring, along with the one or more protruding portions (not shown) on the outer surface of the first damper ring, provide an increase in surface area contact between the second damper ring and the first damper ring. As a result, the one or more channels (not shown) on the outer surface of the first damper ring, in combination with the one or more protruding portions (not shown) on the outer surface of the first damper ring, aid in securing the second damper ring to the first damper ring. As previously discussed, the first damper ring may be secured to the second damper ring by welding, by using one or more mechanical fasteners, by using one or more adhesives and/or by frictional engagement.

In operation, the first damper ring 544 acts like a spring and the second damper ring 546 acts like rotating inertial mass. When the offensive and/or unwanted NVH is present in the shaft assembly (not shown), the offensive and/or unwanted NVH translates through the innermost damper ring 542 to the first damper ring 544. In response to the presence of the unwanted and/or offensive NVH, the first damper ring 544 expands and contracts allowing the second damper ring 546 to rotate and/or vibrate in the opposite direction or in the opposite phase of the unwanted and/or offensive NVH. As a result, the magnitude of the unwanted and/or offensive NVH is reduced, cancelled and/or counteracted.

The damper 540 according to the disclosure, is able to be tuned depending on the type, amount and/or magnitude of the offensive and/or unwanted NVH that is being reduced and/or cancelled. The damper 540 is tuned by making alterations to the first damper ring 544 and/or the second damper ring 546. By altering the material of the first damper ring 544 the spring rate of the first damper ring 544 can be changed depending on the type, amount and/or magnitude of the offensive and/or unwanted NVH that is being reduced and/or cancelled. Similarly, depending on the type, amount and/or magnitude of the offensive and/or unwanted NVH that is being reduced and/or cancelled, the mass of the second damper ring 546 and/or the inertia of the second damper ring 546 can be changed. In a non-limiting example, a damper inertia of 2000-8000 kg-mm^2 will reduce and/or cancel an NVH frequency of 300-600 Hz.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A shaft assembly, comprising:
   a shaft having a first end portion and a second end portion;
   a joint comprising an inner race and an outer race, a plurality of balls and a cage that is disposed between said inner race and said outer race of said joint;
      wherein said inner race of said joint has an inner surface and an outer surface;
   a joint stub shaft having a first end portion, a second end portion and an outer surface;
      wherein said joint stub shaft is co-axial with said shaft and said inner race of said joint;
      wherein said outer surface of said first end portion of said joint stub shaft is drivingly connected to said inner surface of said inner race of said joint;

wherein said second end portion of said joint stub shaft has an increased diameter portion comprising a first end portion, a second end portion and an outer surface;

wherein said second end portion of said increased diameter portion is integrally connected to said first end portion of said shaft;

a damper, comprising: a first damper ring and a second damper ring;

wherein said first damper ring having an inner surface and an outer surface defining a hollow portion therein;

wherein said first damper ring is co-axial with said joint stub shaft;

wherein said inner surface of said first damper ring is integrally connected to said outer surface of said increased diameter portion on said second end portion of said joint stub shaft;

wherein said second damper ring having an inner surface and an outer surface defining a hollow portion therein;

wherein said second damper ring is co-axial with said first damper ring; and wherein said inner surface of said second damper ring is rotatably connected to said outer surface of said first damper ring.

2. The shaft assembly of claim 1, wherein said shaft is a propeller shaft, a drive shaft, a cardan shaft, a double cardan shaft, a universal joint shaft, a universal coupling shaft or a Hooke's joint shaft.

3. The shaft assembly of claim 1, wherein said joint stub shaft further comprises one or more channels on said outer surface of said increased diameter portion of said joint stub shaft;

wherein said one or more channels on said outer surface of said increased diameter portion extend circumferentially along at least a portion of said outer surface of said increased diameter portion of said joint stub shaft; and wherein at least a portion of said first damper ring is disposed within said one or more channels on said outer surface of increased diameter portion of said joint stub shaft.

4. The shaft assembly of claim 1, wherein said first damper ring comprises a plastic material, a rubber material, a synthetic rubber material, a natural rubber material, an elastomeric material or a combination thereof.

5. The shaft assembly of claim 1, wherein said second damper ring comprises a steel forging, a machined steel, a cast steel, an iron forging, a machined iron or a cast iron.

6. The shaft assembly of claim 1, wherein said joint is a constant velocity joint.

7. The shaft assembly of claim 1, further comprising one or more balancing masses integrally connected to an outer surface of said shaft.

8. The shaft assembly of claim 1, wherein said second end portion of said shaft is integrally connected to at least a portion of a tube toke of a universal joint assembly.

9. A shaft assembly, comprising:

a shaft having a first end portion and a second end portion;

a joint comprising an inner race, an outer race, a plurality of balls and a cage that is disposed between said inner race and said outer race of said joint;

wherein said inner race of said joint has an inner surface and an outer surface;

a joint stub shaft having a first end portion, a second end portion and an outer surface;

wherein said joint stub shaft is co-axial with said shaft and said inner race of said joint;

wherein said outer surface of said first end portion of said joint stub shaft is drivingly connected to said inner surface of said inner race of said joint;

wherein said second end portion of said joint stub shaft has an increased diameter portion comprising a first end portion, a second end portion and an outer surface;

wherein said second end portion of said increased diameter portion is integrally connected to said first end portion of said shaft;

a damper, comprising: an innermost damper ring, a first damper ring and a second damper ring;

wherein said innermost damper ring having an inner surface and an outer surface defining a hollow portion therein;

wherein said innermost damper ring is co-axial with said joint stub shaft;

wherein said inner surface of said innermost damper ring is integrally connected to said outer surface of said increased diameter portion on said second end portion of said joint stub shaft;

wherein said first damper ring having an inner surface and an outer surface defining a hollow portion therein;

wherein said first damper ring is co-axial with said innermost damper ring;

wherein said inner surface of said first damper ring is integrally connected to said outer surface of said innermost damper ring;

wherein said second damper ring having an inner surface and an outer surface defining a hollow portion therein;

wherein said second damper ring is co-axial with said innermost damper ring and said first damper ring; and wherein said inner surface of said second damper ring is rotatably connected to said outer surface of said first damper ring.

10. The shaft assembly of claim 9, wherein said shaft is a propeller shaft, a drive shaft, a cardan shaft, a double cardan shaft, a universal joint shaft, a universal coupling shaft or a Hooke's joint shaft.

11. The shaft assembly of claim 9, wherein said joint stub shaft further comprises one or more channels on said outer surface of said increased diameter portion of said joint stub shaft;

wherein said one or more channels on said outer surface of said increased diameter portion extend circumferentially along at least a portion of said outer surface of said increased diameter portion of said joint stub shaft; and wherein at least a portion of said innermost damper ring is disposed within said one or more channels on said outer surface of increased diameter portion of said joint stub shaft.

12. The shaft assembly of claim 9, wherein said innermost damper ring comprises a steel alloy, an aluminum alloy an iron alloy.

13. The shaft assembly of claim 9, wherein said first damper ring comprises a plastic material, a rubber material, a synthetic rubber material, a natural rubber material, an elastomeric material or a combination thereof.

14. The shaft assembly of claim 9, wherein said second damper ring comprises a steel forging, a machined steel, a cast steel, an iron forging, a machined iron or a cast iron.

15. The shaft assembly of claim 9, wherein said joint is a constant velocity joint.

16. The shaft assembly of claim 9, further comprising one or more balancing masses integrally connected to an outer surface of said shaft.

17. The shaft assembly of claim 9, wherein said second end portion of said shaft is integrally connected to at least a portion of a tube toke of a universal joint assembly.

\* \* \* \* \*

UNITED STATES PATENT AND TRADEMARK OFFICE
CERTIFICATE OF CORRECTION

| | | |
|---|---|---|
| PATENT NO. | : 9,670,964 B1 | Page 1 of 1 |
| APPLICATION NO. | : 15/252978 | |
| DATED | : June 6, 2017 | |
| INVENTOR(S) | : Burnard et al. | |

It is certified that error appears in the above-identified patent and that said Letters Patent is hereby corrected as shown below:

In the Specification

Column 1, Line 21: replace the word "mashing" with "meshing".
Column 3, Line 38: replace the word "mashing" with "meshing".
Column 4, Line 47: replace the word "mashing" with "meshing".
Column 5, Line 64: replace the word "mashing" with "meshing".

In the Claims

Claim 8: replace the word "toke" at Column 17, Line 58 with "yoke".
Claim 17: replace the word "toke" at Column 19, Line 8 with "yoke".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*